United States Patent Office 3,442,445
Patented May 6, 1969

3,442,445
CENTRIFUGE FOR COMPLETE PHASE
SEPARATION OF TWO LIQUIDS
Helge Jan Arnold Rydberg, Molndal, and Hans Reinhardt,
Goteborg, Sweden, assignors to Incentive AB, Stockholm, Sweden, a Swedish company
Filed Dec. 13, 1966, Ser. No. 601,526
Claims priority, application Sweden, Dec. 16, 1965,
16,309/65
Int. Cl. B04b 1/12, 11/06
U.S. Cl. 233—18                                      10 Claims

ABSTRACT OF THE DISCLOSURE

A centrifugal separator, radially subdivided into a plurality of separating chambers, each comprising a plurality of circumferentially extending partition walls forming a radial series of separating departments between themselves and the inner and outer walls of the chamber which communicate with each other by ducts at their tops as well as at their bottoms, baffle means being arranged in the ducts to urge liquid streaming in the duct into the interior of each department, and liquid mixture inlet opens in one intermediate department.

---

Figure 1:
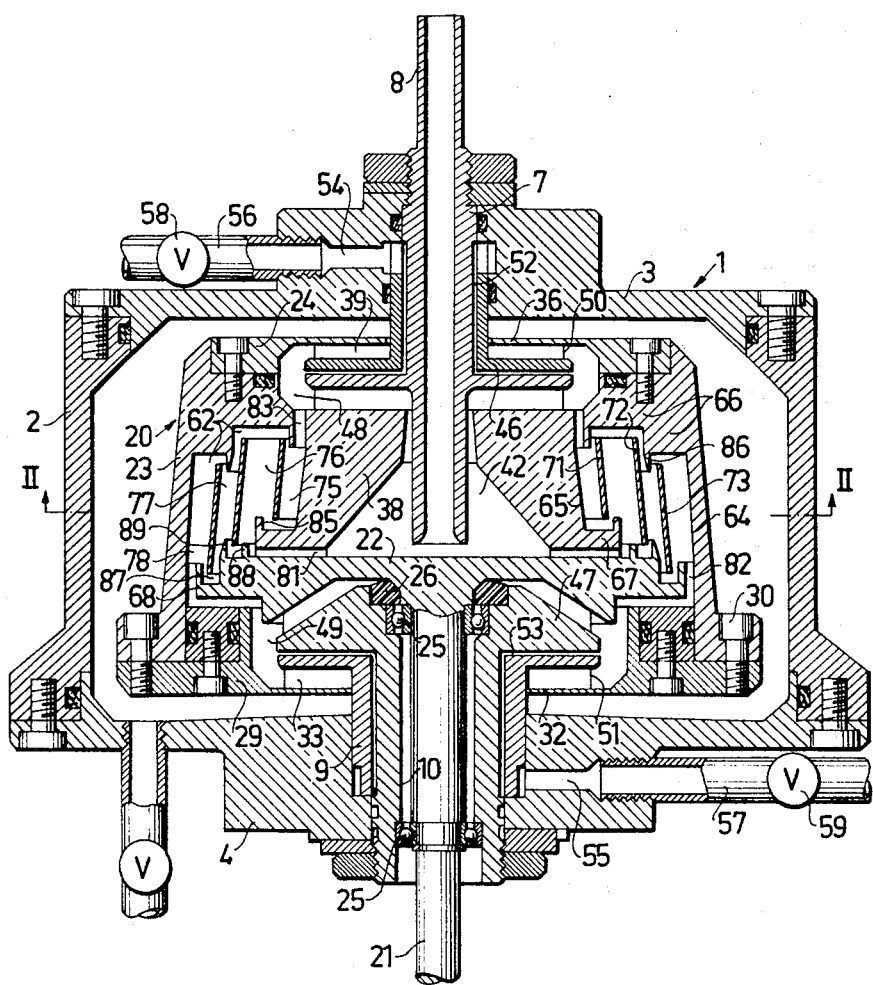

This invention relates to centrifugal separators for liquids and more particularly for separating more or less intimate mixtures of two liquid phases. Such separator usually has a rotary separating bowl containing a separating chamber defined by substantially vertical central, peripheral and radial walls, a bottom wall and a top wall, and communicating, on the one hand, through an inlet channel with a raw liquid chamber arranged centrally of it and, on the other hand, with a light liquid outlet opening near said central wall and a heavy liquid outlet opening near said peripheral wall.

It is an object of the invention to provide a separator which is effective in separating liquid phases and also to provide means by which it is possible to obtain a complete separation of the two liquids ("absolute phase separation") a finely dispersed two-phase liquid mixture.

To obtain these objects and other advantages obvious to those skilled in the art, the centrifugal separator according to the invention comprises a plurality of partition walls extending in said separating chamber in the circumferential direction of said bowl, so as to form between themselves and with said central peripheral vertical walls of the separating chamber a series of separating departments; top and bottom ducts connecting said departments with one another, on the one hand, at their top ends and, on the other hand, at their bottom ends, said raw liquid chamber communicating with the separating chamber so as to supply raw liquids to one only of said departments, preferably one formed between two adjacent partition walls, said partition walls and preferably said vertical walls being inclined relative to the axis of rotation of the bowl; baffle means in said ducts guiding liquid streaming therein into the interior of each department; vertical radial walls in said separating chamber so as to limit the circumferential extension of each chamber to not more than 90°, preferably not more than 45°. It is preferred that the light liquid outlet opens near the top and the central vertical walls and the heavy liquid outlet correspondingly opens near the bottom and the peripheral vertical walls. The light liquid will then be removed from the separator at the top portion thereof and the heavy liquid at the bottom portion thereof. In a preferred embodiment, therefore, the separator comprises in said rotary bowl an upper collecting chamber at a level above said separating chamber and communicating with a liquid outlet near said top wall, and a lower collecting chamber at a level below said separating chamber and communicating with a liquid outlet near said bottom wall, means for discharging liquid accumulated in each collecting chamber, such as a horizontal tearing disc stationary relative to said rotary bowl and extending radially from the central part of the rotary bowl into said collecting chamber. The inlet channel leading from the raw liquid chamber to the separating chamber is preferably arranged in the bottom wall of the chamber. Usually the channel should open into an intermediary separating department.

It is, of course, imperative that the liquid passes to the interior of each separating department so as effectively to be subjected to the separating action. The separator may therefore preferably comprise at least one guide baffle projecting from at least one of said bottom wall and top wall in overlapping relationship to one of said partition walls.

In order that the invention will be better understood, also in its general aspects, one embodiment thereof will now be described in more detail with reference to the attached drawings without, however, thereby limiting the scope of the invention.

Figure 2:
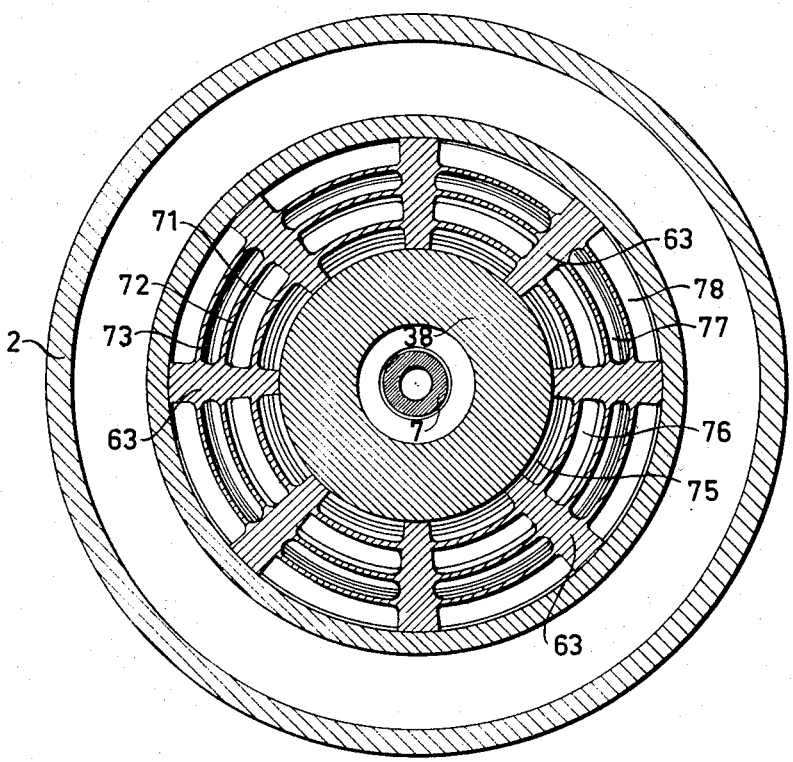

In the drawings:

FIG. 1 is a vertical axial section of a separator according to the invention, and FIG. 2 is a horizontal cross section along the line II—II in FIG. 1.

The rotary portions of the centrifugal separator are enclosed in a centrifuge house generally referred to by reference numeral 1, comprising a cylindrical body 2 and secured thereto a cover 3 and a bottom 4. Passed through an opening in and rigidly secured to the cover 3 is an insert 7 comprising an inlet pipe 8 for the raw liquid to be separated. Similarly passed through an opening in and secured to the bottom 4 is a bottom insert 9 having a central cylindric opening 10. The rotary separator bowl, generally referred to with reference numeral 20, is suspended by the driven shaft 21 attached to the bowl bottom 22 and rotatingly mounted in insert 9 by ball bearings 25 and 25. Between the bowl bottom 22 and insert 9 is a packing 26, which is preferably made from Teflon (a trademark for a polyfluoroethene product). This packing can be made so tight as to make a hermetic seal so that the bowl can be operated at superatmospheric or subatmospheric pressure.

The separator bowl 20 comprises in addition to bottom 22 a hollow substantially cylindric body 23 provided with a horizontal cover 24. The bottom 22 is at its periphery secured to an annular portion of a bottom cover 29, at the outer portion of which the cylindric body 23 is secured with bolts 30. The bottom cover 29 has an extension plate 32 extending close to bottom insert 9. Thereby an enclosure 33 is formed in the bottom structure of the bowl, which is in this case used as an outlet chamber for one of the separated phases. Similarly the top cover 24 has an extension 36 extending close to the top insert 7. The cylindric body 23 extends inwards with a central portion 38 at a region some distance from the top level of the body 23. Thereby, together with extension 36 a top enclosure 39 is formed, which in this case will serve as a collecting chamber for the separated liquid phase not collected in chamber 33. Said central portion 38 may extend inwards to the neighborhood of the feed pipe 8 which opens near the upper surface of bowl bottom 22 but may, preferably, have a reduced portion near said bottom 22 so as to form with the bottom 22 a raw liquid chamber 42.

As the bottom structures 22, 29, 32 of the bowl has a considerable axial extension the rotating bowl will be supported near its center of gravity. The stationary inserts 7 and 9 project into the enclosures or outlet chambers 39 and 33, respectively, and by the pipe 8 into the raw liquid chamber 42 in the rotary bowl 20, thereby giving access to the interior of the bowl during its rotation, so that raw liquid can be supplied and separated phases be removed continuously.

The separated phases are removed from pertaining collecting chambers 39 and 33 by the aid of the stationary tearing discs 46 and 47, respectively, arranged to project slightly into the liquid sumps 48 and 49 through the surfaces 50 and 51 of the liquids accumulated during the separation operation. The tearing discs are provided with liquid channels 52 and 53, respectively for liquid torn off by the discs and opening in channels 54 and 55, respectively in the cover 3 and bottom 4 of the centrifuge house. These channels continue in outlet pipes 56 and 57, respectively, provided with throttling valves 58 and 59, respectively, by which the liquid levels 50 and 51 in the collecting chambers can be set at desired distance from the axis of rotation of the bowl.

The heart of the centrifugal separator is the separating chamber, or rather chambers. The cylindric bowl body 23 contains the separating chambers 62. As will be seen from FIG. 2 eight sector shaped chambers are formed by radial walls 63, preferably extending right up to the peripheral walls 64, but possibly leaving a clearance of one or two millimetres there. In addition to two radial walls 63 and a peripheral wall 64 each separating chamber has a central wall 65 formed by a surface of the central portion 38, and a top wall 66 being a portion of body 23 and finally bottom walls 67, 68 formed partly by a more or less horizontal flange of the central portion 38 and partly by the peripheral portion of bowl bottom 22.

Most important for the present invention are the partition walls, in this case three in number, an inner partition wall 71, a middle one 72 and an outer one 73. They are secured in the chamber so as to leave ducts along the bottom walls 67, 68 and the top wall 66. These partition walls form a series of separating departments 75 between the central wall 65 and partition walls 71, 76 and 77 between the partition walls, and 78 between the outer partition 73 and the peripheral wall 64. In this case the partition walls, and also the central and peripheral walls are slightly inclined to the vertical direction, their lower edges being further from the axis of rotation than their upper edges. Therefore liquid subjected to the centrifugal force will be sub-divided so that the heavy phase moves downwards while the lighter phase moves upwards. Consequently raw liquid introduced through inlet channel 81 will be separated in the separating chamber in a heavy phase accumulating at the peripheral department 78 to be removed through outlet 82 leading to collection chamber 33, and a light liquid phase accumulating in the central department 75 to be removed through outlet 83 leading to collecting chamber 39.

The partition walls 71, 72 and 73 may be set to slope so that the heavy liquid will accumulate near the top wall 66 and the light liquid near the bottom walls 67, 68 but the arrangement as illustrated is, as a rule, to be preferred from a structural point of view.

It being imperative for the invention that the liquid to be separated is passed far into the interior of the separating departments, such as 76 and 77, baffle means have to be provided to prevent the liquid from passing straight way through the ducts along the bottom wall, and even the top wall, of the separating chamber. In the embodiment illustrated baffle ridges are provided, namely ridge 85 at the bottom wall 67 and partition wall 71, and ridge 86 at the upper wall 66 and partition wall 73. For directing the liquid stream to the interior of separating department 78 the lower edge of partition wall 73 is arranged in a groove 87 in the bottom wall 68. Baffle ridge 88 extending from bowl bottom 22 directs the incoming raw liquid into department 76 and the above mentioned ridge 85 directs the heavy liquid coming from department 75 to the interior of department 76. Further baffle ridge 89 projects from bottom wall 68 and projects between partition walls 72 and 73. Thereby heavy liquid from department 76 must pass down into the groove formed by ridges 88 and 89 before entering department 77.

The partition walls are arranged in an overlapping or staggered relationship in order to facilitate the transfer of the liquid to the interior of the separating departments 76 and 77.

In operating the centrifugal separator described the raw liquid, which may be a finely dispersed emulsion, is continuously fed through pipe 8 to form a well in the raw liquid chamber 42 from where the liquid is centrifugally forced through the plurality of channels 81 into the separating chamber 62 and more particularly into separating department 76. Heavy liquid from department 75 also flows into department 76 through the slot formed between wall 71 and ridge 85. The streams intermingle and cause turbulence in the central portions of department 76. The droplets of the liquid phases become more or less arrested and are in that state particularly sensitive to the attack of the centrifugal force. Separation of the liquids occurs and the heavy liquid flows downwards along partition wall 72 down into the groove between ridges 88 and 89, the latter forcing the liquid in upward direction to the interior of department 77. Likewise the light liquid in department 76 will flow along the partition wall 71 in upward direction to the top wall 66. The stream is there bent downwards over the edge of wall 71 and through the slit between that wall and the downwards projecting portion in which outlet 83 is arranged so as to enter into department 75. Obviously, through the arrangement of the partition walls and baffle means the liquid will be repeatedly arrested and subjected to separation effectively. The separated phases will travel in a more or less zig zag shaped course through the separating chamber, the heavy liquid at the bottom portion and the light liquid at the top portion of the separating chamber.

The light liquid accumulates in collecting chamber 39 and forms there a liquid sump 48 into which a tearing disc 46 projects slightly and extracts the liquid through channels 52, 54 and 56. Similarly heavy liquid passes from department 78 through outlet 82 into collecting chamber 33 to form a liquid sump 49 which is emptied by tearing discs 47, the liquid escaping through channels 53, 55 and 57.

The bowl 20, which in a laboratory separator may have a diameter of the order of 15 cm., is rotated with a speed of e.g. 16,000 rev. per min., creating a centrifugal force field of the order of 15,000 g., i.e. 15,000 times gravity. The liquid has the separating chamber a retention time of a few seconds.

Each phase, which can be completely free from contamination by the other phase, is removed through pipe 56 or 57, respectively, and the removal is controlled by valves 58 and 59, respectively.

The radial walls 63 prevent the liquid particles to move circumferentially. Very small particles have a tendency to move so and would thus not be separated out correctly but remain in and contaminate the other phase, if the separating chamber 62 has too great a circumferential extension.

What we claim is:

1. A centrifugal separator having a rotary separating bowl containing a separating chamber defined by substantially vertical central, peripheral and radial walls, a bottom wall and a top wall, and communicating, on the one hand, through an inlet channel with a raw liquid chamber arranged centrally of it and, on the other hand, with a light liquid outlet opening near said central wall and a heavy liquid outlet opening near said peripheral wall, characterized in a plurality of partition walls extending in said separating chamber in the circumferential direction of said bowl, so as to form between themselves and with said central and peripheral vertical walls of the separating chamber a series of separating departments; top and bottom ducts connecting said departments with one another, on the one hand, at their top ends and, on the other hand, at their bottom ends, said raw liquid chamber communicating with the separating chamber so as to supply raw liquid to one only of said departments, baffle means in said ducts guiding liquid streaming therein into the interior of each department; and having at least one vertical radial wall in said separating chamber so as to limit the circumferential extension of said chamber.

2. A centrifugal separator as in claim 1, in which said light liquid outlet opens near said top and central vertical walls and said heavy liquid outlet opens near said bottom and peripheral vertical walls.

3. A centrifugal separator as in claim 1, in which said inlet channel from said raw liquid chamber is arranged in said bottom wall.

4. A centrifugal separator as in claim 1, comprising at least one guide baffle projecting from at least one of said bottom walls and top wall in overlapping relationship to one of said partition walls.

5. A centrifugal separator as in claim 1, in which out of two adjacent partition walls the outer one is staggered relative to the inner one so as to project beyond the outermost horizontal edge of said inner one.

6. A centrifugal separator as in claim 1, comprising in said rotary bowl an upper collecting chamber at a level above said separating chamber and communicating with a liquid outlet near said top wall, and a lower collecting chamber at a level below said separating chamber and communicating with a liquid outlet near said bottom wall, means for extracting liquid accumulated in each collecting chamber, such as a horizontal tearing disc stationary relative to said rotary bowl and extending radially from the central part of the rotary bowl into said collecting chamber.

7. A centrifugal separator as in claim 1, in which said raw liquid chamber communicates with said separating chamber so as to supply raw liquid to only one of said departments formed between two adjacent partition walls.

8. A centrifugal separator as in claim 1, in which said vertical walls are inclined relative to the axis of rotation of the bowl.

9. A centrifugal separator as in claim 1, having at least one vertical radial wall in said separating chamber so as to limit the circumferential extension of said chamber to not more than 90°.

10. A centrifugal separator as in claim 9, having at least four vertical radial walls in said separating chamber.

References Cited
UNITED STATES PATENTS

| | | | |
|---|---|---|---|
| 1,614,803 | 1/1927 | Perrier | 233—18 |
| 1,968,788 | 7/1934 | Tomlinson | 233—18 |
| 2,711,854 | 6/1955 | Kjellgren | 233—18 X |
| 2,715,994 | 8/1955 | Steinacker | 233—18 X |

ROBERT W. JENKINS, *Primary Examiner.*